United States Patent
Bekele et al.

(10) Patent No.: US 11,168,185 B2
(45) Date of Patent: Nov. 9, 2021

(54) PROCESS FOR PREPARING SINGLE PHASE VINYLIDENE CHLORIDE-BASED ADDITIVE BLENDS

(71) Applicant: Cryovac, LLC, Charlotte, NC (US)

(72) Inventors: Solomon Bekele, Charlotte, NC (US); Matthew D. Dawe, Simpsonville, SC (US)

(73) Assignee: Cryovac, LLC, Charlotte, NC (US)

( * ) Notice: Subject to any disclaimer, the term of this patent is extended or adjusted under 35 U.S.C. 154(b) by 116 days.

(21) Appl. No.: 16/619,132

(22) PCT Filed: Jun. 29, 2018

(86) PCT No.: PCT/IB2018/054870
§ 371 (c)(1),
(2) Date: Dec. 4, 2019

(87) PCT Pub. No.: WO2019/003210
PCT Pub. Date: Jan. 3, 2019

(65) Prior Publication Data
US 2020/0190269 A1    Jun. 18, 2020

Related U.S. Application Data

(60) Provisional application No. 62/527,344, filed on Jun. 30, 2017.

(51) Int. Cl.
*C08J 3/22* (2006.01)
*C08J 3/00* (2006.01)
*C08K 5/45* (2006.01)

(52) U.S. Cl.
CPC ............ *C08J 3/22* (2013.01); *C08J 3/005* (2013.01); *C08K 5/45* (2013.01); *C08J 2327/08* (2013.01)

(58) Field of Classification Search
CPC .......... C08J 3/005; C08J 3/22; C08J 2327/08; C08K 5/45
See application file for complete search history.

(56) References Cited

U.S. PATENT DOCUMENTS

| 4,360,612 A | 11/1982 | Trumbull et al. |
| 5,202,188 A | 4/1993 | Bekele |
| 2014/0302300 A1 | 10/2014 | Beyer et al. |
| 2016/0272785 A1 | 9/2016 | Beyer et al. |

FOREIGN PATENT DOCUMENTS

GB    1219946 A    1/1971

*Primary Examiner* — Edward J Cain
(74) *Attorney, Agent, or Firm* — Jason R. Womer

(57) ABSTRACT

Provided is a process for preparing a PVDC additive blend in which an additive is blended with PVDC under high shear blending to produce a highly uniform blend in which the additive is homogeneously distributed throughout the PVDC. It has been found that performing high shear blending in multiple successive stages in which the concentration of the additive in the blend is reduced in each successive stage helps in prove the uniformity of the PVDC additive blend. For example, the high shear blending may be carried out in 2 to 6 stages, and in particular, from 2 to 4 stages. Also provided is a PVDC additive blend having a uniform blend of PVDC and an additive, such as a blend of a PVDC copolymer of vinylidene chloride and methyl acrylate and a fluorescing agent, such as 2,2'(2,5-thiophenylendiyl)bis(5-tert-butylbenzoxazole).

19 Claims, 5 Drawing Sheets

PROCESS FOR PREPARING SINGLE PHASE VINYLIDENE CHLORIDE-BASED ADDITIVE BLENDS

FIELD

The present invention relates generally to a process of blending an additive with a polyvinylidene chloride polymer and

BACKGROUND

Polyvinylidene chloride polymers (PVDC) are used in a wide variety of packaging applications due to their barrier properties. For example, PVDC is often used as a barrier layer in a film to prevent the passage of gases, such as oxygen and moisture vapor, through the film.

Barrier films comprising a layer of PVDC have found particular wide spread use in food packaging industries. In commercial practice, such barrier films may include multiple layers in which the film includes other layers that improve the films properties, such as stability, toughness, and sealability.

In some cases, it may be desirable to include an additive that is blended with the PVDC in the barrier layer. However, PVDC is immiscible with many additives which makes it difficult to produce a homogenous blend in which the additive is uniformly distributed in the PVDC. As a result, regions of the barrier layer may devoid, or may not include a sufficient amount of the additive.

Accordingly, there still exists a need for processes of uniformly blending additives with PVDC.

SUMMARY

The present invention helps to address the aforementioned needs by providing a method of preparing a polyvinylidene chloride polymer (PVDC) composition in which an additive is uniformly blended into the PVDC. In particular, embodiments of the invention provide a method of blending an additive into a PVDC under high shearing blending conditions.

In one embodiment, a process for preparing a uniform blend of a polyvinylidene chloride polymer (PVDC) and an additive, the process comprising high shear blending a first addition of a PVDC polymer and an additive to obtain a first blend; and high shear blending at least a portion of the first blend with a second addition of a PVDC polymer to obtain a second blend in which the additive is uniformly distributed in the PVDC.

In some embodiments, the process of preparing the blend of a PVDC and an additive may comprise a step high shear blending at least a portion of the second blend with a third addition of a PVDC polymer.

In an embodiment, the process may include a step elevating the temperature during one of the high shear blending steps to a temperature that is less than melt degradation temperature of the PVDC. For example, during high shear blending, the blend may be heated to a temperature from about 60 to 70° C., and in particular a temperature of about 65° C.

In some embodiments, the process may further comprise a step of cooling the blend during high shear blending following the step of elevating the temperature.

In some embodiments, the additive is selected from the group consisting of plasticizers, heat stabilizers, acid scavenging agents, processing aids, fillers, lubricants, pigments, detectable components, and combinations thereof. In one embodiment, the additive comprises a fluorescent agent, such as fluorescent agent selected from the group consisting of 2,2'(2,5-thiophenylendiyl)bis(5-tert-butylbenzoxazole), 2,2'-(1,2-ethenediyl) bis(4,1-phenylene)bisbenzoxazole, 4,4'-Bis(2-sulfonatostyryl)biphenyl disodium salt, 4,4'-diamino-2,2'-stilbenedisulfonic acid, and combinations thereof.

In some embodiments, the final concentration of the additive in the PVDC is from about 5 to 50 parts per million (ppm).

In an embodiment, the PVDC comprises a copolymer of vinylidene chloride and at least one alkyl acrylate selected from the group consisting of methyl acrylate, ethyl acrylate, butyl acrylate, and combinations thereof.

In an embodiment, the PVDC comprises a copolymer of vinylidene chloride and methyl acrylate, and the additive comprises 2,2'(2,5-thiophenylendiyl)bis(5-tert-butylbenzoxazole).

In a further aspect, embodiments of the invention are directed to a process of preparing a blend of polyvinylidene chloride polymer (PVDC) and a detectable component, the process comprising introducing a first addition of a PVDC polymer and a detectable component into a high shear blender; subjecting the first addition of the PVDC polymer and detectable component to high shear blending to obtain a first masterbatch; introducing a second addition of a PVDC polymer and at least a portion of the first masterbatch into a high shear blender; subjecting the second addition of the PVDC polymer and the at least a portion of the first masterbatch to high shear blending to obtain a second masterbatch; introducing a third addition of a PVDC polymer and at least a portion of the second masterbatch into a high shear blender; and subjecting the third addition of the PVDC polymer and the at least a portion of the second masterbatch to high shear blending to obtain a PVDC additive blend in which a concentration of the detectable component in the PVDC additive blend is from 5 to 50 ppm.

In some embodiments, the steps of high shear blending may include steps of elevating and cooling the temperature of each of the respective blends during blending.

In one embodiment, the steps of subjecting the first addition of the PVDC polymer and detectable component to high shear blending includes elevating the blend to a temperature between about 60 and 70° C., and then cooling the blend to a temperature that is from about 25 to 35° C.

In an embodiment, a concentration of the detectable component in the first masterbatch is from about 20,000 to 40,000 ppm. In one embodiment, a concentration of the detectable component in the second masterbatch is from about 2,000 to 4,000 ppm.

In some embodiments, the detectable component comprises 2,2'(2,5-thiophenylendiyl) bis(5-tert-butylbenzoxazole), 2,2'-(1,2-ethenediyl)bis(4,1-phenylene) bisbenzoxazole, 4,4'-Bis(2-sulfonatostyryl)biphenyl disodium salt, 4,4'-diamino-2,2'-stilbenedisulfonic acid, or combinations thereof.

In an embodiment, the PVDC comprises a copolymer of vinylidene chloride and methyl acrylate.

In one aspect, a PVDC additive blend is provided that is prepared in accordance with one or more methods described herein.

In another aspect, a PVDC blend comprising a blend of a PVDC polymer and a detectable component is provided in which the concentration of the detectable component in the blend is from about 5 to 50 ppm. In some embodiments, the uniformity of the detectable component in the PVDC is such that the concentration of the additive in the PVDC is not subject to a variation that is more or less than 20% of the target concentration of the additive in the PVDC.

Embodiments of the invention are also directed to a film comprising an oxygen barrier layer comprising the PVDC blend.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a flow chart illustrating a process of preparing a PVDC additive blend that is in accordance with an embodiment of the invention;

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments of the invention are directed to a process for preparing a composition comprising a blend of a PVDC and an additive (hereinafter referred to as a PVDC additive blend). The additive, which is immiscible in PVDC, is blended with PVDC under high shear blending to produce a highly uniform blend in which the additive is homogeneously distributed throughout the PVDC. Preferably, the PVDC additive blend comprises a single phase system. Embodiments of the invention are also directed to a PVDC additive blend comprising a uniform blend of PVDC and an immiscible additive.

Generally, it has been found that it is difficult to obtain a uniform PVDC additive blend when blending an immiscible additive with PVDC. More specifically, the additive tends to clump and form agglomerates that are difficult to distribute uniformly in the PVDC. Under such circumstances, the PVDC additive blend may not be suitable for its intended purpose.

It has been found that blends having improved uniformity may be prepared by blending the PVDC with an immiscible additive in successive stages under high shear conditions. In particular, it has been found that blending the additive and PVDC under high shear blending generates viscous heat and high shear stresses. The thus generated heat and shear stresses causes the PVDC to undergo deformation so that a single phase material is obtained in which the additive is uniformly blended into the PVDC.

In one embodiment of the invention, the PVDC additive blend is prepared by blending PVDC and the additive in a high shear mixer in which the PVDC and additive are subjected to high shear at temperatures below the decomposition temperature of the additive. Although in some embodiments, the high shear blending may be carried out in a single step process, it has been found that performing high shear blending in multiple successive stages in which the concentration of the additive in the blend is reduced in each successive stage helps in prove the uniformity of the PVDC additive blend. For example, in one embodiment, the high shear blending may be carried out in 2 to 6 stages, and in particular, from 2 to 4 stages. In a preferred embodiment, the high shear blending is performed in 3 stages.

Figure 1:
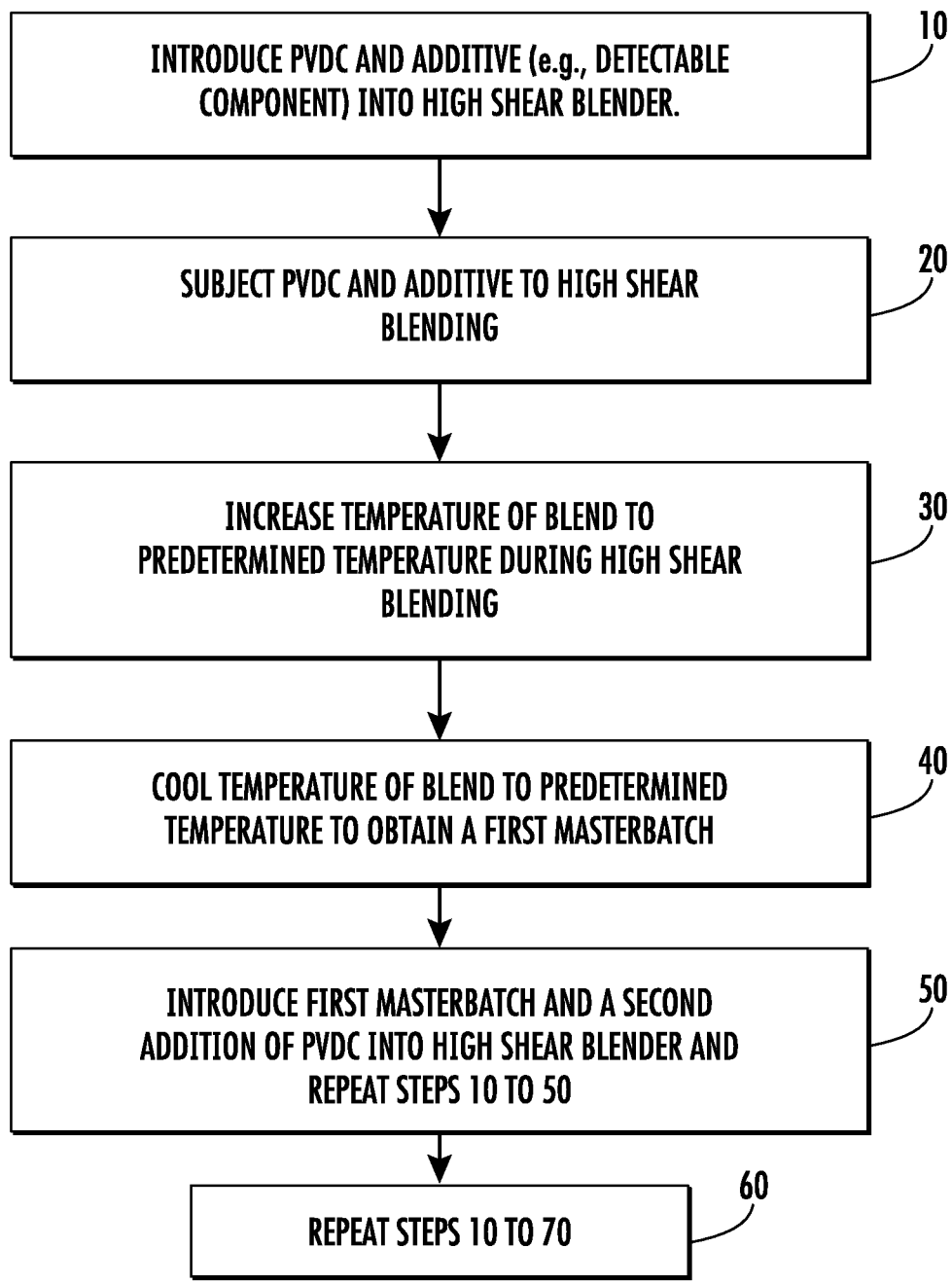
Figure 5:
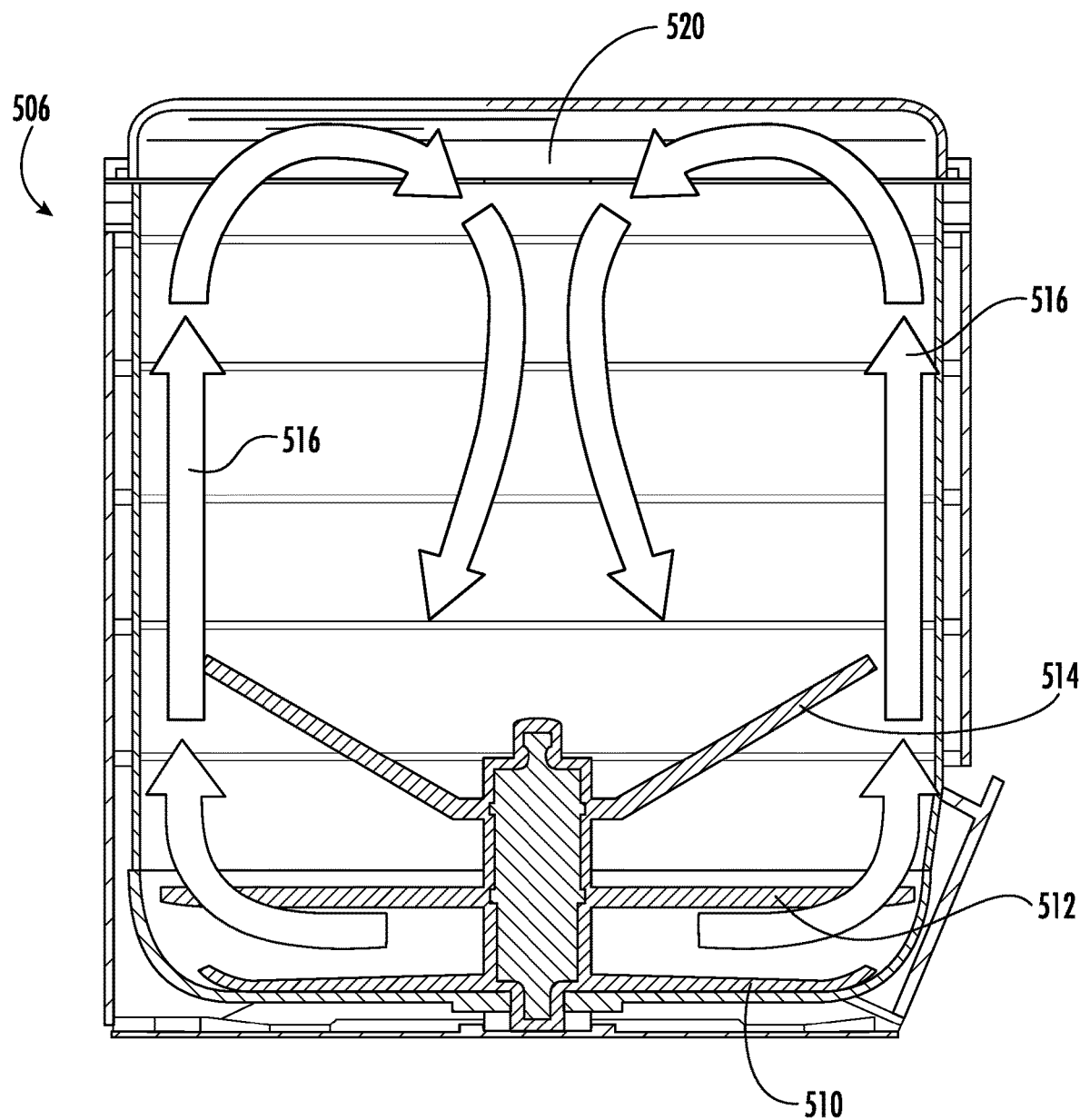
FIG. 5 is a cross-sectional illustration of mixing of the PVDC and additive using a high shear blender.

With reference to FIG. 5, a cross-section example of a high shear blender that may be used in embodiments of the invention is shown and designated by reference character 500. As shown, the blender comprises a series of mixing blades 510, 512, and 514 that are oriented successively overlying (stacked on top of each other) in which each of the blades has varying design configurations. Generally, the blades are operated by a single motor so that the blades turn at the same rate of rotation relative to each other. As can be seen in FIG. 1, rotation of the blades creates fluid flow that result in a vortex of particles and air (516) within the interior of the blender that causes the particles of the PVDC and additive to generate shear within the blender.

In addition to generating shear, the rotation of the blades causes the PVDC and additive to be mixed at high speeds in the vortex. This results in formation of the vortex of air and particles in which the PVDC and additive are mixed to produce a highly uniform blend of the PVDC and additive. The high shear blender may also include a deflection paddle 520 positioned towards the top of the interior of the blender. The deflection paddle forces the fluid flow (e.g., air and PVDC/additive particles) downwardly and back towards the mixing blades.

During high shear blending, the blend may be subject to shear rates ranging from about 100 to 10,000 s$^{-1}$, and in particular, from about 100 to 1,000 s$^{-1}$, and more particularly, from about 100 to 200 s$^{-1}$.

During high shear blending, the blending of the PVDC and additive results in generation of heat. For PVDC, the blending parameters, such as time, rotational speed, and temperature, are selected so that the heat generated during high shear blending does not exceed the temperature at which PVDC begins to degrade or breakdown. Typically, the temperature within the high shear blender should not exceed 70° C.

In some embodiments, the PVDC and additive are heated only by the internal heat generated due to high shear blending. In other embodiments an external heater could be used if desired.

In one embodiment, the PVDC additive blend is prepared in a high shear blending process in which PVDC and an additive are blended in a two stage process. In a first stage, a first masterbatch PVDC additive blend is prepared by blending a first addition of PVDC and the additive to prepare the first masterbatch PVDC additive blend. In the second stage, the first masterbatch PVDC additive blend obtained in the first stage is then blended under high shear with a second addition of PVDC to obtain a second masterbatch having an additive concentration that is less than the concentration of the first masterbatch. For example, the concentration of the additive in first masterbatch PVDC additive blend may be from about 600 to 6,000 ppm, and the concentration of the second masterbatch PVDC additive blend may be from about 5 to 500 ppm.

In yet another embodiment, the PVDC additive blend may be prepared in a high shear blending process comprising three stages. As in the two stage process described above, a first masterbatch PVDC additive blend is prepared under high shear blending in which a blend having a higher concentration is obtained. Then, a second masterbatch PVDC additive blend is obtained by high shear blending the first masterbatch PVDC additive blend with a second addition of PVDC to obtain a second masterbatch having an additive concentration that is less than the concentration of the first masterbatch. In the third stage, the second masterbatch PVDC additive blend is blended under high shear with a third addition of PVDC to obtain a third masterbatch PVDC additive blend having an additive concentration that is lower than the additive concentration obtained in the second stage. For example, the concentration of the additive in first masterbatch PVDC additive blend may be from about 20,000 to 40,000 ppm, the concentration of the second masterbatch PVDC additive blend may be from about 2,000 to 4,000 ppm, and the concentration of the third masterbatch PVDC additive blend may be from about 5 to 500 ppm, and in particular, from about 5 to 50 ppm.

In some embodiments, it has been advantageously discovered that by including a heating and cooling step during the high shear blending, uniformity of the additive in the PVDC may be improved. For example, in one embodiment a high shear blending of the PVDC and additive is performed in which the blend is heated during high shear blending to a preset elevated temperature (e.g, a temperature below the temperature at which melt degradation of the PVDC may occur). Once the preset temperature is reached, the elevated temperature may be maintained, or the temperature of the blend is cooled to a preset temperature during the high shear blending. It has been found that cooling the blend during high shear blending helps to keep the particles loose and prevent agglomeration of the additive in the blend.

The high shear blending process may be performed using a batch process or, alternatively, a continuous process. For example, in the batch process, a first master batch may be prepared according to the process discussed above, and a portion of the first masterbatch may be combined with a second or third addition of PVDC to arrive at a batch or final PVDC additive blend having a desired additive concentration. In this way, successive masterbatches may be prepared having different additive concentrations. The successive masterbatches may be packaged and stored for future use in preparing PVDC additive blends in accordance with embodiments of the invention.

In a continuous process, subsequent PVDC additions may be added following each successive blending stage until a final PVDC additive blend having the desired additive concentration is obtained.

Generally, the PVDC additive blend has a particle distribution in which the particles in the blend range from about 25 to 500 microns, and in particular from about 50 to 400 microns. In one embodiment, the PVDC additive blend has an average particle size that is from about 200 to 300 microns, and in particular, from about 225 to 275 microns, and more particularly, from about 240 to 260 microns. In one embodiment, the PVDC additive blend has an average particle size of about 250 microns.

The PVDC additive blend preferably comprises a single phase continuous system in which the additive is uniformly blended into the PVDC. As used herein, the terms "uniform" or "uniformly" with respect to the distribution of the additive in the PVDC additive blend means that the concentration of the additive in the PVDC is not subject to a variation that is more or less than 20%, and more preferably, a variation that is not more or less than 10% of the target concentration of the additive in the PVDC in a sample size that is from 1 to 10 grams.

In an embodiment, the PVDC additive blend contains the additive blended into the PVDC to a degree of uniformity that each of 10 random 1 gram samples (taken from the blend) varies in weight percent additive present by no more than 20 percent above or below the target concentration. The target concentration is the weight percent of the additive added to the PVDC in making the blend, i.e., the weight percent additive on a total blend weight basis, determined by the total weight additive blended into the total weight PVDC in the making of the blend. In another embodiment, the PVDC additive blend contains the additive blended into the PVDC to a degree of uniformity that each of 10 random 0.1 gram samples varies in weight percent additive present by no more than 20 percent above or below the target concentration. In another embodiment, the PVDC additive blend contains the additive blended into the PVDC to a degree of uniformity that each of 10 random 0.01 gram samples varies in weight percent additive present by no more than 20 percent above or below the target concentration. In another embodiment, the PVDC additive blend contains the additive blended into the PVDC to a degree of uniformity that each of 10 random 0.001 gram samples varies in weight percent additive present by no more than 20 percent above or below the target concentration. In another embodiment, the PVDC additive blend contains the additive blended into the PVDC to a degree of uniformity that each of 10 random 0.0001 gram samples varies in weight percent additive present by no more than 20 percent above or below the target concentration.

It should be recognized that the concentration of the additive in the PVDC additive blend generally depends on the desired properties of the article, such as a film, in which the blend may be utilized. For example, typical concentrations of the additive in the PVDC additive blend may range from about 4 to 1,000 ppm, and in particular, from about 5 to 300 ppm, and more particularly, from about 5 to 50 ppm.

In one embodiment, the concentration of the additive in the PVDC additive blend may be less than 1,000, 900, 800, 600, 500, 400, 300, 200, and 100 ppm. In particular, the concentration of the additive in the PVDC additive blend may be less than 95, 90, 85, 80, 75, 70, 65, 60, 55, 50, 45, 40, 35, 30, 25, and 20 ppm. More particularly, the concentration of the additive in the PVDC additive blend may be less than 19, 18, 17, 16, 15, 14, 13, 12, 11, 10, 9, 8, 7, 6, 5, 4, 3, 2, or 1 ppm. In some embodiments, the concentration of the additive in the PVDC additive blend may be greater than 1, 2, 3, 4, 5, 6, 7, 8, 9, 10, 11, 12, 13, 14, 15, 16, 17, 18, 19, and 20 ppm. In still other embodiments, the concentration of the additive in the PVDC additive blend may be greater than 25, 30, 35, 40, 45, 50, 55, 60, 65, 70, 75, 80, 90, 95, and 100 ppm. In some embodiments, the concentration of the additive in the PVDC additive blend may be greater than 100, 200, 300, 400, 500, 600, 700, 800, 900, and 1,000 ppm.

As used herein, the term polyvinylidene chloride polymer ("PVDC") includes hompolymers, copolymers, and interpolymers of vinylidene chloride. Examples of suitable PVDC copolymers that may be used in embodiments of the invention include copolymers of vinylidene chloride and at least one alkyl acrylate selected from the group consisting of methyl acrylate, ethyl acrylate, and butyl acrylate, or combinations thereof. Additional PVDC copolymers may include copolymers of vinylidene chloride and one or more of styrene, vinyl chloride, acrylic acid, acrylonitrile, methyl methacrylate, ethyl methacrylate, and vinyl acetate. Examples of two suitable PVDC polymers that may be used in accordance with the present invention comprises PVDC and methyl acrylate copolymer available from Solvin under the tradenames IXAN® PV 910 and IXAN® PV 934. Other suitable PVDC polymers that may be used in accordance with the present invention are available from Dow Chemical Company.

A wide variety of additives may be blended with the PVDC polymer to form a homogenous PVDC composition. In particular, embodiments of the invention are directed to the blending of additives having low miscibility in the PVDC polymer. Examples of suitable additives may include plasticizers, heat stabilizers, acid scavenging agents, processing aids, fillers, lubricants, pigments, and the like.

In one particular embodiment, the additive comprises a detectable component. As used herein, a detectable component comprises a compound that can be spectroscopically detected by adsorption and/or emission in the electromagnetic spectrum. In some embodiments, the detectable component may comprise compounds that emit light in the visible, infrared, or ultraviolet electromagnetic spectrum.

In an embodiment, the detectable component is a composition capable of emitting electromagnetic radiation. The emitted radiation can be from any portion of the electromagnetic spectrum, such as radio waves, infrared light, visible light, ultraviolet light, X-rays, gamma rays, etc. The detectable component can be excited by incident electromagnetic radiation which causes the detectable component to emit electromagnetic radiation. The incident radiation to excite the detectable component, and the emitted radiation from the detectable component, may be unique to the detectable component, and depending upon the identity of the detectable component, may be from any portion of the electromagnetic spectrum.

In some embodiments, the detectable component may comprise UV-absorbing compounds with distinctive absorption and/or fluorescence properties. Preferred UV-absorbing detectable components may have a unique optical signature that is not present in nature and not easily confused with signals from natural sources. A preferred UV-detectable component has multiple unique absorption or fluorescent features in its UV spectra. For example, as used herein, electromagnetic radiation at 375 nanometers may be used as incident radiation to excite a detectable component known as 2,5-thiophenediylbis(5-tert-butyl-1,3-benzoxazole), which is assigned CAS registry, number 7128-64-5, and which is also known as: 2,2'-(2,5-thiophenediyl)bis[5-tert-butylbenzoxazole]; 2,5-bis-2(5-tert-butyl-benzoxalyl)thiophene; 2,5-bis(5-t-butyl-2-benzoxazolyl) thiophene; 2,5-bis-(5-t-butylbenzoxazolyl-[2-yl])-thiophene; 2,5-bis-(5-tert-butyl-2-benzoxazol-2-yl)thiophene; 2,5-bis(5'-tert-butyl-2-benzoxazol-2-yl)thiophene; 2,5-bis (5'-tert-butyl-2'-benzoxazolyl)thiophene; 2,5-bis(5-tert-butyl-2-benzoxazolyl)thiophene; 2,5-bis(5-tert-butyl-benzoxazol-2-yl)thiophene; 2,5-bis(5-tert-butylbenzoxazoyl)-2-thiophene; 2,5-di(5-tert-butylbenzoxazol-2-yl)thiophene; 2,2'-(2,5-thiophenediyl)bis[5-(1, 1-dimethylethyl)-benzoxazole, 2,5-bis(5'-tert-butyl-2-benzoxazolyl)thiophene; and 2,5-thiophenediylbis (5-tert-butyl-1,3-benzoxazole). The absorption of the incident radiation at 375 nanometers causes the excited 2,5-thiophenediyibis(5-tert-butyl-1,3-benzoxazole) detectable component to emit radiation at 435 nanometers.

Additional examples of detectable components may include 2,2'(2,5-thiophenylendiyl) bis(5-tert-butylbenzoxazole), 2,2'-(1,2-ethenediyl)bis(4,1-phenylene) bisbenzoxazole, 4,4'-Bis(2-sulfonatostyryl)biphenyl disodium salt, 4,4'-diamino-2,2'-stilbenedisulfonic acid, and combinations thereof.

In one embodiment, the detectable component may be in the form of a dry powder. In other embodiments, the detectable component may be in form of a liquid, such as a solution. For example, the detectable component may be soluble in a solvent or a liquid that is blended with the PVDC polymer.

In one embodiment, aspects of the invention are particularly useful in the production of films comprising PVDC as a barrier layer. In the packaging of oxygen sensitive products, such as food, it is important that the packaging film maintain its oxygen barrier properties. If there are defects or discontinuities in the barrier layer, such as the presence of pinholes, voids, die lines, ruptures, or the like, oxygen will be able to diffuse into the package at the point of the defects/discontinuities. This may result in spoilage or an undesirable appearance in the packaged product.

It has been found that by uniformly blending a detectable component into the PVDC prior to extrusion, it is possible to detect defects in the barrier layer during film production. For example, in one embodiment a film comprising a barrier layer comprising the PVDC additive blend is exposed to electromagnetic radiation at a wavelength that is absorbed by the detectable component. In response, the detectable component emits light that is detectable by a sensor. If a region of the film does not emit light, this may be an indication of a defect in the barrier layer. As a result, corrective action can then be taken at the production facility to correct the problem.

In one embodiment, the invention is directed to a process of preparing a PVDC additive blend in which the additive comprises a detectable component. In a preferred embodiment, the additive may consist of a detectable component. For example, in one embodiment a polyvinylidene chloride methacrylate polymer is high shear blended with 2,2'(2,5-thiophenylendiyl)bis(5-tert-butylbenzoxazole) as a detectable component to form a PVDC additive blend.

In one embodiment, the invention is directed to a process of preparing a PVDC additive blend in which the additive comprises a detectable component. In an embodiment, the additive may comprise a thermal stabilizer. In an embodiment, the additive may comprise both the detectable component and the thermal stabilizer. In an embodiment, the additive may comprise the detectable component, the thermal stabilizer, and a plasticizer.

Thermal stabilizers for use in combination with PVDC include acrylate/styrene polymers, such as are disclosed in U.S. Pat. No. 5,202,188, which is hereby incorporated, in its entirety, by reference thereto. The thermal stabilizer may comprise 1 wt % to 4 wt % acrylate/styrene polymer, such as butyl acrylate/methyl methacrylate/styrene copolymer.

Plasticizers for use in combination with PVDC include compounds with epoxy groups attached, such as epichlorohydrin/bisphenol A epoxy, epoxidized linseed oil, and epoxidized soybean oil also function as plasticizers by reducing intermolecular forces and, as well, act as scavengers for HCL.

The PVDC (e.g., polyvinylidene chloride methacrylate copolymer) may be high shear blended with one or more of the detectable component, the thermal stabilizer, and the plasticizer. In an embodiment, the PVDC is high shear blended with both the detectable component and the thermal stabilizer. In an embodiment, the PVDC is high shear blended with the detectable component, the thermal stabilizer, and the plasticizer.

With reference to the flow chart of FIG. 1, a process of preparing a PVDC additive blend comprising a detectable component is shown. In step 10, PVDC and a detectable component are supplied to a high shear blender. In step 20, the PVDC and detectable component are subjected to blending under high shear. In step 30, the temperature of the blend while undergoing high shear blending is increased to a predetermined elevated temperature. For example, for 2,2' (2,5-thiophenylendiyl)bis(5-tert-butylbenzoxazole) the temperature of the blend may be elevated to a temperature ranging from about 50 to 70° C., and in particular, about 60 to 65° C. Once the predetermined elevated temperature is obtained, the blend will be cooled at step 40 while continuing to undergo high shear blending. At step 40, the blend of the PVDC and detectable component are cooled to a predetermined cooled temperature (e.g., 25 to 35° C.) at which point blending is stopped. At this point, a first masterbatch comprising the PVDC and detectable component is obtained. In step 50, the first masterbatch is high shear blended with a second addition of PVDC as described above in steps 10 to 50 to obtain a second masterbatch comprising the PVDC and detectable component. In step 60, the previous steps are repeated x number of times, such as from 1 to 6 times. For example, in one embodiment the second masterbatch is high shear blended with a third addition of PVDC as described above in steps 10 to 50 to obtain a third masterbatch comprising the PVDC and detectable component. The third masterbatch preferably has a concentration of detectable component that is from about 5 to 50 ppm, and in particular, from about 10 to 40 ppm.

Figure 2:
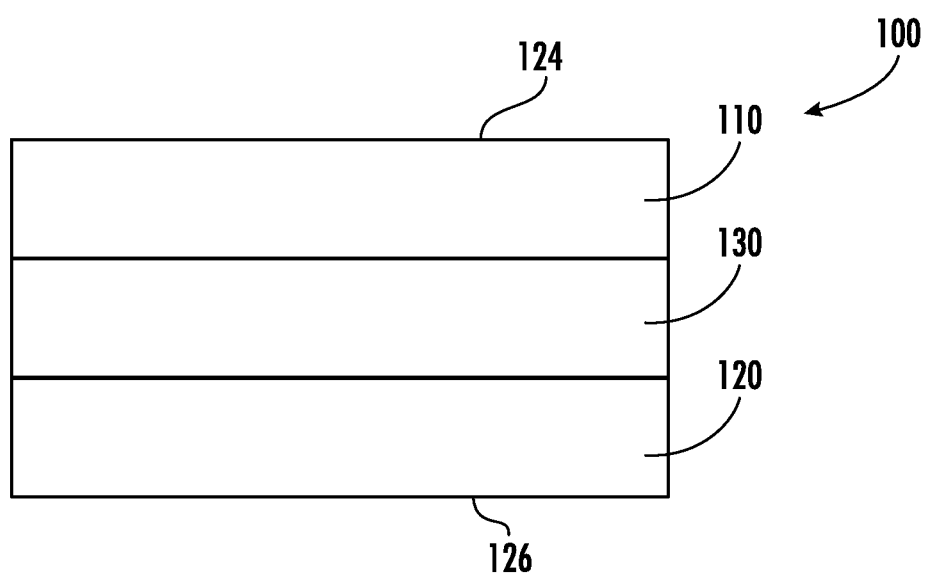
FIG. 2 illustrates a film that is in accordance with at least one embodiment of the invention.

In one aspect, embodiments of the invention are directed to articles comprising a blend of PVDC and an additive. For example, in one aspect embodiments of the invention provide a film comprising a barrier layer comprised of the PVDC additive blend. For example, FIG. 2 illustrates a multilayer film 100 having an oxygen barrier layer comprising the PVDC additive blend. In the embodiment illustrated in FIG. 2, the multilayer film 100 includes a first outer layer 110, also referred to as a "sealant layer", a second outer layer 120, also referred to as an "outer abuse layer", an oxygen barrier layer 130. In some embodiments, surface 124 of the multilayer film may comprise an inner surface of a package made from the multilayer film, and surface 126 may comprise an outer abuse layer for the package.

In one embodiment, the oxygen barrier layer may be sandwiched between one or more intermediate layers, such as adhesive layers or functional layers (e.g., additional barrier layers, and/or strengthening layers (also referred to as "inner abuse layers")), that may be disposed between the oxygen barrier layer 130 and the sealant layer 110 and/or the abuse layer 120. Functional layers may be the same or different from each other. In one embodiment, functional layers may comprise a polymer that is selected to provide further mechanical properties, barrier properties, or a combination thereof. In one embodiment, the film may include one or more additional functional layers. The number, orientation, and type of layers in the multilayer film may be varied to provide a film having desired properties, for example, strength, modulus, abuse resistance, optical properties, barrier properties, and the like. In one embodiment, the film may have from 2 to 20, layers, and in particular, from about 3 to 15 layers, and more particularly, from about 5 to 12 layers.

Generally, the overall thickness of the multilayer film may range from between about 0.5 to 30 mils, and in particular between about 2 to 10 mils, such as from about 3 to 6 mils. The thickness of the oxygen barrier layer 130 is typically between about 0.05 and 4 mils thick, and in particular between about 0.2 and 2 mil thick.

The multilayer film of the present invention can be used in a wide variety of packaging applications, for example in the production of bags, pouches, lidstocks, vacuum packaging, vacuum skin packaging, vertical and horizontal form fill packaging, and the like. In some embodiments, surface 124 of the multilayer film may comprise an inner surface of a package made from the multilayer film, and surface 126 may comprise an outer abuse surface for the package. For example, in one embodiment, the sealant layer comprises a polymeric material that is capable of adhering to another component of a package, such as a tray, one or more additional sheets of film, or to itself to form a package having an interior space in which an oxygen sensitive product can be disposed. In one particular embodiment, surface 124 of the multilayer film 100 can be adhered to itself to form a bag or pouch. In one embodiment, the sealant layer comprises a heat sealable polymeric material.

Multilayer films comprising a layer comprised of the PVDC additive blend of the present invention may be prepared by a process which involves the co-extrusion of a thick tubular shape laminate film (called "tape") which is quenched just under the die, folded by a pair of nip rolls and then heated to a temperature typically comprised between about 105 and about 120° C., and in particular of at least 110° C., and expanded, still at this temperature, by internal air pressure to get the transversal orientation and by a differential speed of the pinch rolls which hold the bubble to provide the longitudinal orientation so as to get a cylindrically-shaped laminate thin film. After being so stretched the film is rapidly cooled to somehow freeze-in the resulting film a latent shrinkability ("trapped bubble" technique).

Alternatively the films according to the present invention can also be prepared by extrusion coating wherein the multilayer tube to be oriented is formed by extruding or co-extruding a first tape (called the primary tape) and then coating said tape with the other layers which are either sequentially extruded or in a single step coextruded thereon.

Still alternatively the film according to the present invention may be prepared by flat co-extrusion or extrusion coating followed, after a quenching step, by the orientation of the extruded film by tenterframe at a temperature generally comprised between about 105° C. and about 120° C.

Multilayer films in accordance with the present invention can be used in packaging articles having various forms. Suitable articles include, but are not limited to, flexible sheet films, flexible bags, rigid containers or combinations thereof. Typical flexible films and bags include those used to package various food items and may be made up of one or a multiplicity of layers to form the overall film or bag-like packaging material.

Articles in the form of flexible films and bags normally have thickness ranging from about 5 to 260 micrometers. Typical rigid or semi-rigid articles include plastic, paper or cardboard containers, such as those utilized for juices, soft drinks, as well as thermoformed trays or cups normally have wall thickness in the range of from 100 to 1000 micrometers. The multilayer film of the present invention can be used as an integral layer or as non-integral layer of a formed packaging article.

Besides packaging articles applicable for food and beverage, packaging for articles for other oxygen-sensitive products can also benefit from the present invention. Such products may include pharmaceuticals, oxygen sensitive medical products, corrodible metals or products, electronic devices and the like.

As discussed above, embodiments of the present invention may be particularly suited for preparing films having a layer with a detectable component that may be used to inspect the film for the presence of discontinuities or defects in the film. In this regard, films in accordance with the invention may be used in conjunction with an inspection system that is configured to analyze the film for discontinuities or defects in a layer of film comprising the PVDC additive blend, such as in an oxygen barrier layer.

In an embodiment, the inspection system hardware includes: (i) one or more cameras in a camera network (ii) lighting (iii) one or more signal processors (iv) an operator interface (v) an input/output interface (vi) an encoder, and (vii) an industrial computer. In an embodiment, the system configuration can be such that the integration of the camera(s) and electronics does not require a computer on each film production line (or film processing line). Rather, a single server can be used for many lines.

In an embodiment each camera in the camera network communicates digital data to a signal processor residing in the industrial computer where image processing and machine learning algorithms are employed to complete the inspection tasks.

In an embodiment the lighting can be an ultraviolet backlight with software for controlling shutter speed and light intensity. In embodiments in which the process is designed to simultaneously inspect multiple film layers at the same time for the same film, multiple lights can be used with one or more controls for shutter speed and light intensity.

In an embodiment computer-based signal processors conduct processing tasks such as image segmentation, image de-noising, contrast enhancement, thresholding, and/or pattern recognition. The processing tasks can include feature extraction, feature selection, and/or feature fusion, to achieve defect detection and defect classification. The signal processor(s) can achieve parallel processing tasks.

One embodiment of a machine vision system that can be adapted to carry out the inspection of the moving web is a system marketed by Isra Surface Vision Inc. This system operates at 320 megahertz. With the 4K line-scan color camera, using the standard lens, each scan has 4096 pixels across. Each pixel has a gray scale value of from 0 to 255, with 0 being white, 255 being black, and 1-254 being shades of grey. An alternative embodiment employs a 4K line scan monochrome camera. Using the standard lens with the monochrome camera, each scan has 4096 pixels across.

Not every discontinuity or defect is necessarily in need of detection and reporting. A threshold value can be set so that only defects above the threshold size are flagged for removal. For example, the threshold can be set at a discontinuity or thin region having a size of at least 2 millimeters in at least one direction, i.e., a discontinuity or thin region having a size of at least 2 millimeters in the machine direction and/or at least 2 mm in the transverse direction. Alternatively, the threshold can be set at a size of at least 1 millimeter in at least one direction, i.e., a discontinuity or thin region of at least 1 millimeter in at least one direction. Such a threshold can be set even if the system has the capability to see discontinuities down to a size of as low as 10 microns in at least one direction. The setting of the threshold value is different from the capability of the machine vision system to detect a discontinuity and/or thin region down to at least a particular size in at least one direction. Rather, the setting of the threshold value is the setting of the minimum value of the size of the discontinuities/thin spots which trigger the generation of the signal in response thereto. That threshold can be set at any desired value, and is different from the capability of the machine vision system to detect discontinuities down to at least a specified size.

Figure 3:
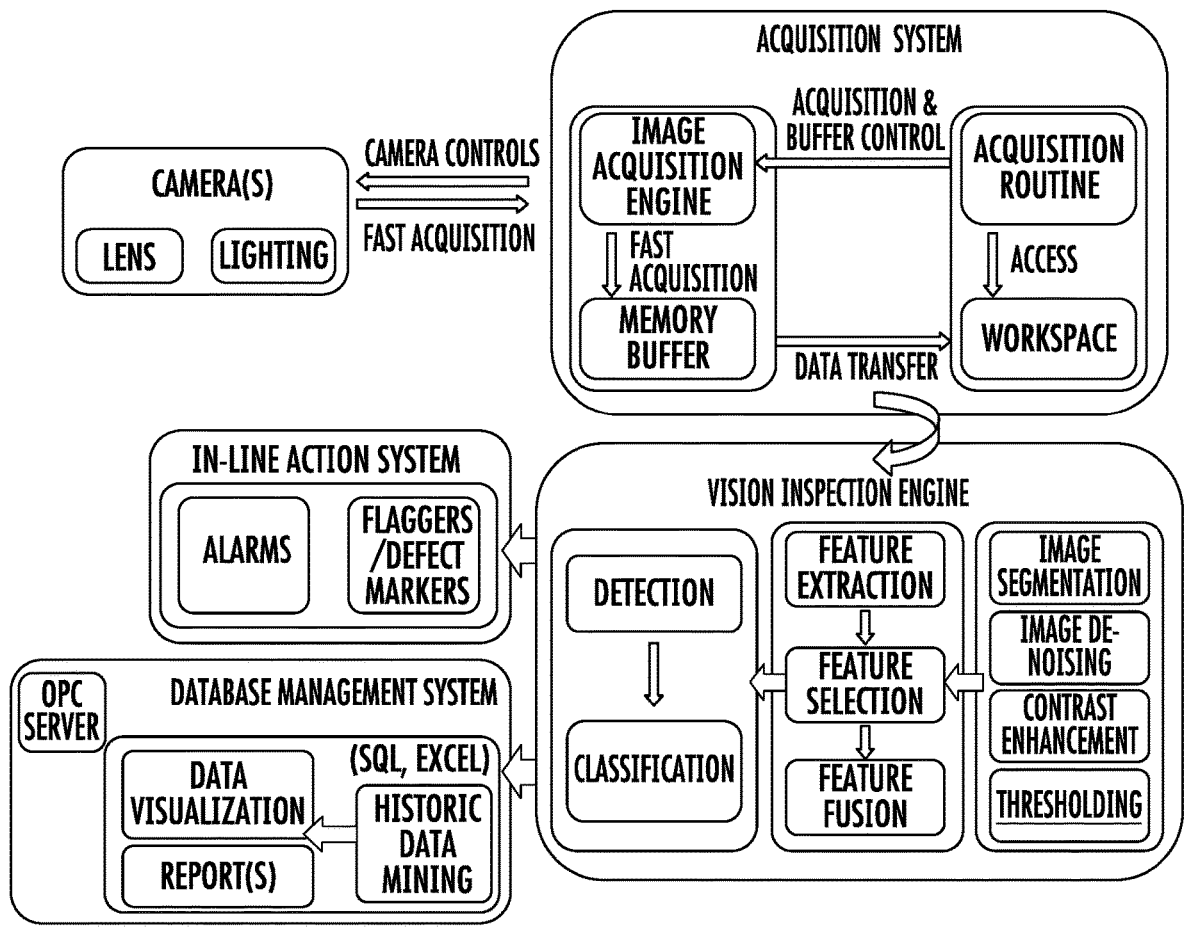
FIG. 3 is a schematic of a system for assessing continuity of a barrier layer of a film, including a flow diagram for data acquisition, data processing, and an alert for identifying the presence or absence of a defect in the film.

An embodiment of a vision system design including a data flow diagram for data acquisition and data analysis is set forth in FIG. 3. The vision system design of FIG. 3 includes a data flow diagram including one or more cameras, a data acquisition system, a vision inspection engine, an in-line action system, and a database management system.

The camera may be a color camera or a monochrome camera. The lighting used with the camera may have adjustable intensity. Although the camera may be an area-scan camera or a line-scan cameral, the line-scan camera is preferred because it produces less data that can be analyzed more quickly. Although the camera may have 4K or 8K pixels per line, 4K is adequate to inspect a flat tape, a flat film, an annular tape, an annular hot-blown film (a non-heat shrinkable film that is oriented at a temperature above the melting point), and/or an annular heat-shrinkable film tubing. Annular tapes and films can be inspected in lay-flat configuration, with the images providing data on the continuity of both lay-flat sides of the tape or film.

Using an appropriate combination of camera head, lighting, and lens configuration, a series of images are acquired and fed into the acquisition system where the data is buffered and transferred to the inspection engine for further processing. A series of signal processing tasks are conducted such as image segmentation, image de-noising, contrast enhancement, thresholding, pattern recognition (including feature extraction, feature selection, and feature fusion), to achieve defect detection and defect classification. The detection results are further fed into an in-line action system to set up pre-determined alarms, film flagging, displaying an image of a discontinuity, displaying data pertaining to one or more discontinuities including displaying data related to geometric characteristics of the discontinuity, location of the discontinuity, degree of occurrence of discontinuities; severity of discontinuities, and/or generating a report of discontinuity data. Data pertaining to discontinuities can be displayed instantaneously and online, or after production is complete, i.e., offline, i.e., not on the fly, the data being accessible in an offline database management system. Using data mining, the data can be manipulated, visualized, and organized into any on-demand report forms desired.

In an embodiment, the operator interface software runs on the industrial computer. Defect data is displayed on the interface and archived in a resident database. Defect data and images are displayed real time on the interface. Instantaneous, historical, and statistical data can be viewed on-demand on the interface. The system can be setup to selectively detect and accurately classify barrier-related film defects such as barrier thin spots or regions, missing barrier, and barrier discontinuities including discontinuity geometric characteristics. Images of each defect can be classified, stored, and displayed. A high-resolution image of each defect can be captured in real time. Discrete defect information such as individual defect geometric information and statistics of group defects can be provided for instantaneous decision-making and actions regarding process improvement and monitoring such as defect alarming. Various outputs for marking/flagging and alarming can be set for different defect severity levels. Data can be exported, for example, to MS Excel and/or a SQL database located anywhere on the network, with data mining software allowing various reports to be easily generated automatically and/or on-demand. Defect data is processed on a processing unit such as a digital processing board. Flagging can be used in conjunction with rewinding the film with one or more defects followed by using slitter to cut out the defects in the film. Flagging can be carried by applying a label to the film at (or corresponding with) the location of the defect in the film. The application of a metal label to the film allows the roll of film to be readily scanned before the roll of film is placed into commerce or used for packaging products or other end use in which the presence of a defect would be detrimental to the objectives to be achieved in the use of the film.

In an embodiment, the standard input/output interface allows for external signal inputs such as new roll indication, web break indication, and pause inspection indication. Outputs for alarms on user-defined defect alarm criteria are also handled through the input/output interface. Outputs can also be initiated to control downstream flagging or marking devices. Alarms can be activated for defects of different pre-defined severities or criteria. Alarm and defect information can be sent via OPC (i.e., software interface standard) to the plant network, programmable logic controller (PLC), or supervisory control and data acquisition/human machine interface (SCADA/HMI).

In an embodiment, the encoder is used to measure the film speed so that the location of a detected defect is ascertainable, particularly down the length of the tape or tubing or flat film being inspected. A series of pulses from the encoder is received by the system and counted. The count is sent to the processor to determine the distance down the web at which the detected defect is located.

Figure 4:
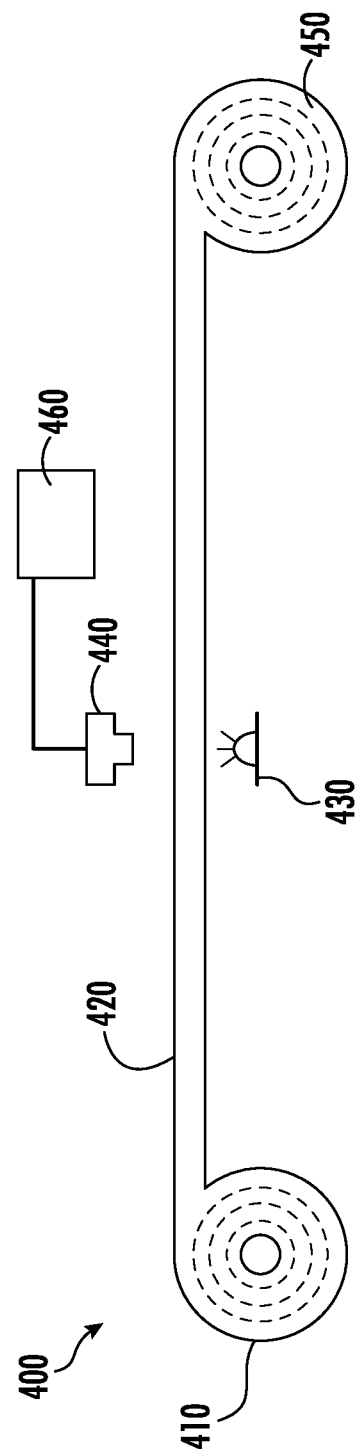
FIG. 4 is a schematic of a process for scanning a film with a machine vision system while the film is being forwarded at a processing speed.

FIG. 4, is a schematic illustration of an inspection system that is in accordance with an embodiment of the invention, and that is broadly designated with reference character 400. As shown, a roll of wound film 410 has a film 420 comprising a barrier layer comprised of the PVDC additive blend thereon, with film being unwound, forwarded over ultraviolet light source 430 and under camera head 440 and rewound as wound up roll 450. Once unwound from roll 410, the film 420 in lay-flat configuration is passed over ultraviolet (UV) light source 430 and is impinged from below by incident radiation (e.g., at 375 nanometers (nm)) from UV-light source 430, with the radiation exciting the detectable component in the PVDC layer of the film. At the same moment that film 420 received the incident radiation, film 420 is passed under a color line-scan camera head 440 located over film 420, in a position directly across and the location at which UV-light source 430 was under the film 420. As illustrated in FIG. 4, the vision system color camera head 440 may be positioned above the film 420 in a position directly over UV-light source 430.

In one embodiment, the camera head 440 may be positioned and configured to scan across the film 420 programmed to look only at the blue light (although the color camera may be programmed to see red, green and blue divided into 256 discrete colors), i.e., to look only at a wavelength of about 435 nanometers. In one embodiment, the camera exposure time may be selected based on the requirements necessary to detect the presence and/or absence of the detecatable component. For example, in one embodiment, the camera exposure time may be about 100 microseconds, and the camera resolution may be about 4096 pixels per scan along each scan line, which scan line was in the transverse direction relative to the orientation of the coated film tapes being inspected.

Images taken from the camera, processed by the signal processors residing in the industrial computer 460, enable production of a scan signal chart providing an assessment of the continuity of the oxygen barrier layer in the film 420.

Further embodiments of a vision system that may be used in accordance with the present invention are described in copending U.S. Provisional Application No. 62/456,357, filed Feb. 8, 2017, and entitled Process for In-line Inspection of Functional Film Layer Containing Detectable Component, the contents of which are hereby incorporated by reference in their entirety.

The following examples are provided for illustrating one or more embodiments of the present invention and should not be construed as limiting the invention

EXAMPLES

In the following example, PVDC additive blends were prepared by high shear blending. The materials used in the examples are identified below.

PVDC: IXAN® PV 910; vinylidene methacrylate copolymer; available from Solvay of Brussels, Belgium.

OB: BENETEX™ OB Plus; optical brightener having the chemical formula 2,2'-(2,5-thiophenediyl)bis(5-tert-butyl-benzoxazole); available from Mayzo, Inc. of Suwanee, Ga.

In each example, the PVDC additive blend was prepared in three successive stages in which powders of the PVDC and additive were blended under high shear blending conditions. High shear blending was performed with a 500 liter high shear Zeppelin vertical mixer.

In each stage, the blend was blended for approximately 10 minutes at a blending speed of 150 revolutions per minute (RPM). Each stage included a heating and cooling stage. During the initial heating stage, the blend of the PVDC and OB were blended at high shear until the temperature of the blend reached 65° C. The shear rate during this initial heating stage, was typically between 50 to 200 s$^{-1}$. Once the temperature reached 65° C., the PVDC additive blend was discharged into a cooling mixer, and then blend until the temperature of the blend reached 30° C. The blending in the cooling mixer was done at lower shear rates than in the heating stage, and were typically between 10 to 100 s$^{-1}$.

At the completion of each stage, samples of the PVDC additive blend were obtained, and an average concentration of the OB in the blend was obtained according to test method ASTM D 5765.

Stage 1: Preparation of Masterbatch 1

1800 g of PVDC and 54 g of the OB were introduced into the blender and subjected to high shear blending as discussed above to obtain a masterbatch 1 (MB1) having an average additive concentration of 27,800 ppm.

Stage 2: Preparation of Masterbatch 2

110 g of MB1 obtained in stage 1 and 2150 g of PVDC were introduced into the blender and subjected to high shear blending as discussed above obtain a masterbatch 2 (MB2) having an average additive concentration of 2,910 ppm.

Stage 3: Preparation of Final PVDC Additive Blend

In this stage, two blends (Samples 1 and 2) were prepared having different concentrations of the OB in the final PVDC additive blend. In the first blend, 2247 g of PVDC and 23 g of MB2 obtained from Stage 2 were introduced into the blender and subjected to high shear blending to obtain a PVDC additive blend having an average additive concentration of 15 ppm. In the second blend, 2201 g of PVDC and 68 g of MB2 obtained in Stage 2 were introduced into the blender and subjected to high shear blending to obtain a PVDC additive blend having an additive concentration of 38 ppm.

TABLE 1

Preparation of PVDC Additive Blend

| Sample | Amount of PVDC (g) | Amount of MB2 (g) | Final additive concentration (ppm) |
|---|---|---|---|
| 1 | 2247 | 23 | 15 |
| 2 | 2201 | 68 | 38 |

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A process for preparing a uniform blend of a polyvinylidene chloride polymer (PVDC) and an additive, the process comprising
   high shear blending a first addition of a PVDC polymer and an additive to obtain a first blend;
   high shear blending at least a portion of the first blend with a second addition of a PVDC polymer to obtain a second blend; and
   high shear blending at least a portion of the second blend with a third addition of a PVDC polymer
   in which the additive is uniformly distributed in the PVDC.

2. The process of claim 1 further comprising a step elevating the temperature during one of the high shear blending steps to a temperature that is less than the decomposition temperature of the additive.

3. The process of claim 2, further comprising a step of cooling the blend during high shear blending following the step of elevating the temperature.

4. The process of claim 1, wherein the additive is selected from the group consisting of plasticizers, thermal stabilizers, acid scavenging agents, processing aids, fillers, lubricants, pigments, detectable components, and combinations thereof.

5. A process for preparing a uniform blend of a polyvinylidene chloride polymer (PVDC) and an additive, wherein the additive comprises a fluorescent agent, the process comprising
   high shear blending a first addition of a PVDC polymer and an additive to obtain a first blend; and
   high shear blending at least a portion of the first blend with a second addition of a PVDC polymer to obtain a second blend in which the additive is uniformly distributed in the PVDC.

6. The process of claim 5, wherein the fluorescent agent is 2,2'(2,5-thiophenylendiyl)bis(5-tert-butylbenzoxazole), 2,2'-(1,2-ethenediyl)bis (4,1-phenylene)bisbenzoxazole, 4,4'-Bis(2-sulfonatostyryl)biphenyl disodium salt, 4,4'-diamino-2,2'-stilbenedisulfonic acid, or a combination thereof.

7. A process for preparing a uniform blend of a polyvinylidene chloride polymer (PVDC) and an additive, the process comprising
   high shear blending a first addition of a PVDC polymer and an additive to obtain a first blend; and
   high shear blending at least a portion of the first blend with a second addition of a PVDC polymer to obtain a second blend in which the additive is uniformly distributed in the PVDC, wherein the additive comprises a thermal stabilizer comprising an acrylate/styrene copolymer.

8. The process of claim 7, wherein the additive further comprises a fluorescent agent comprising at least one member selected from the group consisting of 2,2'(2,5-thiophenylendiyl)bis(5-tert-butylbenzoxazole), 2,2'-(1,2-ethenediyl)bis (4,1-phenylene)bisbenzoxazole, 4,4'-bis(2-sulfonatostyryl)biphenyl disodium salt, 4,4'-diamino-2,2'-stilbenedisulfonic acid, or a combination thereof.

9. The process of claim 8, wherein the additive further comprises a plasticizer comprising an epoxidized oil.

10. A process for preparing a uniform blend of a polyvinylidene chloride polymer (PVDC) and an additive, the process comprising
    high shear blending a first addition of a PVDC polymer and an additive to obtain a first blend; and
    high shear blending at least a portion of the first blend with a second addition of a PVDC polymer to obtain a second blend in which the additive is uniformly distributed in the PVDC, wherein a final concentration of the additive in the PVDC is from about 5 to 50 ppm.

11. The process of claim 1, wherein the PVDC comprises a copolymer of vinylidene chloride and at least one alkyl acrylate selected from the group consisting of methyl acrylate, ethyl acrylate, butyl acrylate, and combinations thereof.

12. A process for preparing a uniform blend of a polyvinylidene chloride polymer (PVDC) and an additive, the process comprising
    high shear blending a first addition of a PVDC polymer and an additive to obtain a first blend; and
    high shear blending at least a portion of the first blend with a second addition of a PVDC polymer to obtain a second blend in which the additive is uniformly distributed in the PVDC, wherein the PVDC comprises a copolymer of vinylidene chloride and methyl acrylate, and the additive comprises 2,2'(2,5-thiophenylendiyl) bis (5-tert-butylbenzoxazole).

13. A process of preparing a blend of polyvinylidene chloride polymer (PVDC) and a detectable component, the process comprising
    introducing a first addition of a PVDC polymer and a detectable component into a high shear blender;
    subjecting the first addition of the PVDC polymer and detectable component to high shear blending to obtain a first masterbatch;
    introducing a second addition of a PVDC polymer and at least a portion of the first masterbatch into a high shear blender;
    subjecting the second addition of the PVDC polymer and the at least a portion of the first masterbatch to high shear blending to obtain a second masterbatch;
    introducing a third addition of a PVDC polymer and at least a portion of the second masterbatch into a high shear blender;
    subjecting the third addition of the PVDC polymer and the at least a portion of the second masterbatch to high shear blending to obtain a PVDC additive blend in which a concentration of the detectable component in the PVDC additive blend is from 5 to 50 ppm.

14. The process of claim 13, wherein each of the steps of high shear blending includes steps of elevating and cooling the temperature of each of the respective blends during blending.

15. The process of claim 14, wherein the steps of subjecting the first addition of the PVDC polymer and detectable component to high shear blending includes elevating the blend to a temperature between about 60 and 70° C., and then cooling the blend to a temperature that is from about 25 to 35° C.

16. The process of claim 14, wherein a concentration of the detectable component in the first masterbatch is from about 20,000 to 40,000 ppm and the detectable component in the second masterbatch is from about 2,000 to 4,000 ppm.

17. The process of claim 13, wherein the detectable component comprises 2,2'(2,5-thiophenylendiyl)bis(5-tert-butylbenzoxazole), 2,2'-(1,2-ethenediyl)bis(4,1-phenylene) bisbenzoxazole, 4,4'-Bis (2-sulfonatostyryl)biphenyl disodium salt, 4,4'-diamino-2, 2'-stilbenedisulfonic acid, or combinations thereof.

18. The process of claim 14, wherein the PVDC comprises a copolymer of vinylidene chloride and methyl acrylate.

19. A PVDC blend comprising a blend of a PVDC polymer and a detectable component in which the concentration of the detectable component in the blend is from about 5 to 50 ppm, and wherein the uniformity of the detectable component in the PVDC is such that the concentration of the additive in the PVDC is not subject to a variation that is more or less than 20% of a target concentration of the additive in the PVDC.

* * * * *